W. GIERTSEN.
CHAIN FEED SAW.
APPLICATION FILED JUNE 7, 1913.
1,109,747.
Patented Sept. 8, 1914.
3 SHEETS—SHEET 1.
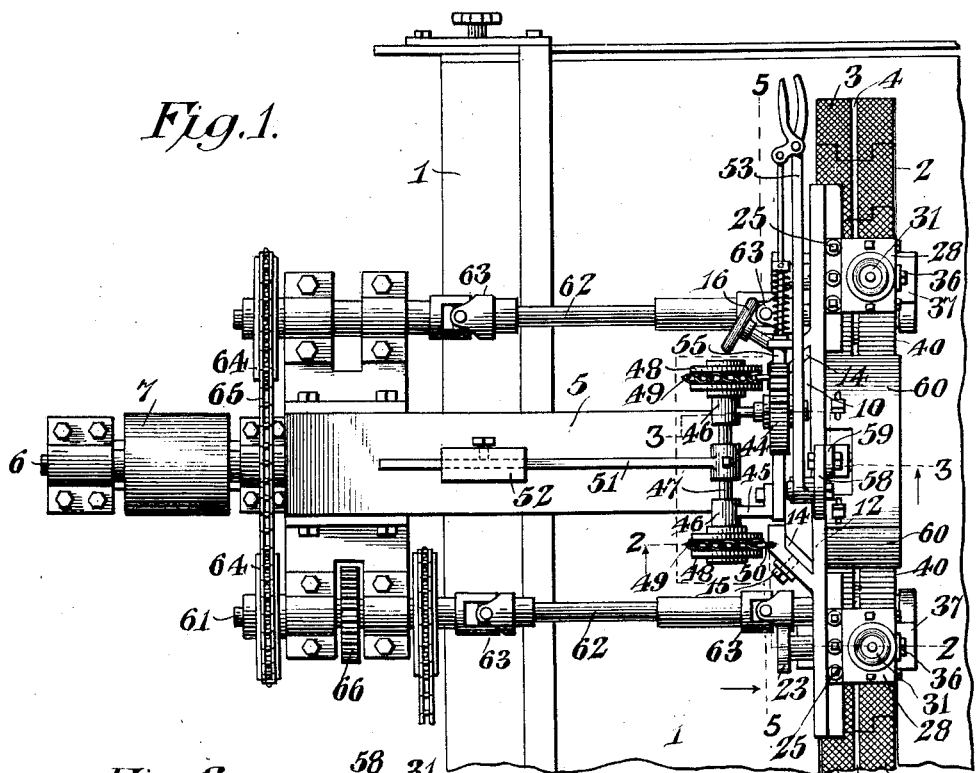
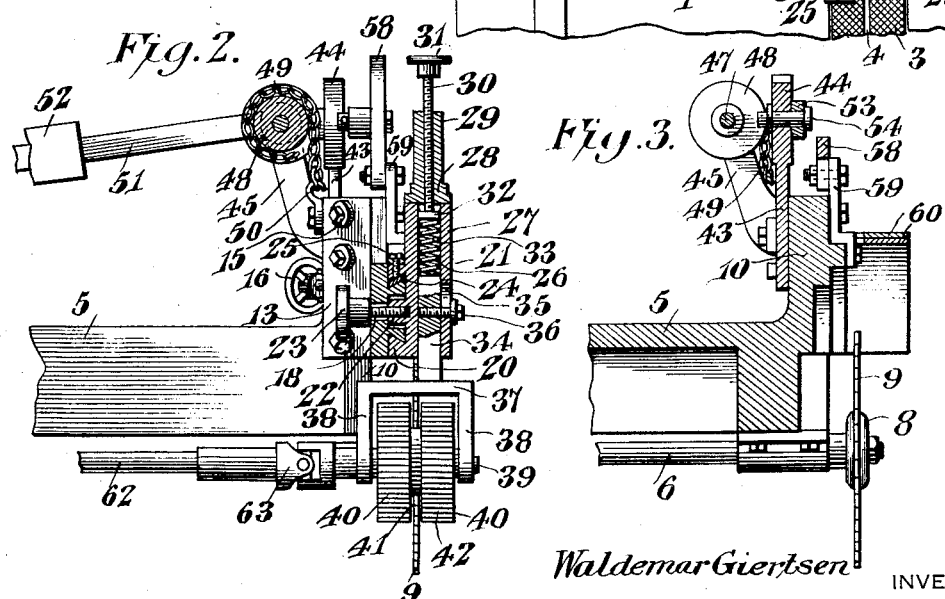
WITNESSES
Waldemar Giertsen INVENTOR
BY 
ATTORNEY W. GIERTSEN.
CHAIN FEED SAW.
APPLICATION FILED JUNE 7, 1913.
1,109,747.
Patented Sept. 8, 1914.
3 SHEETS—SHEET 2.
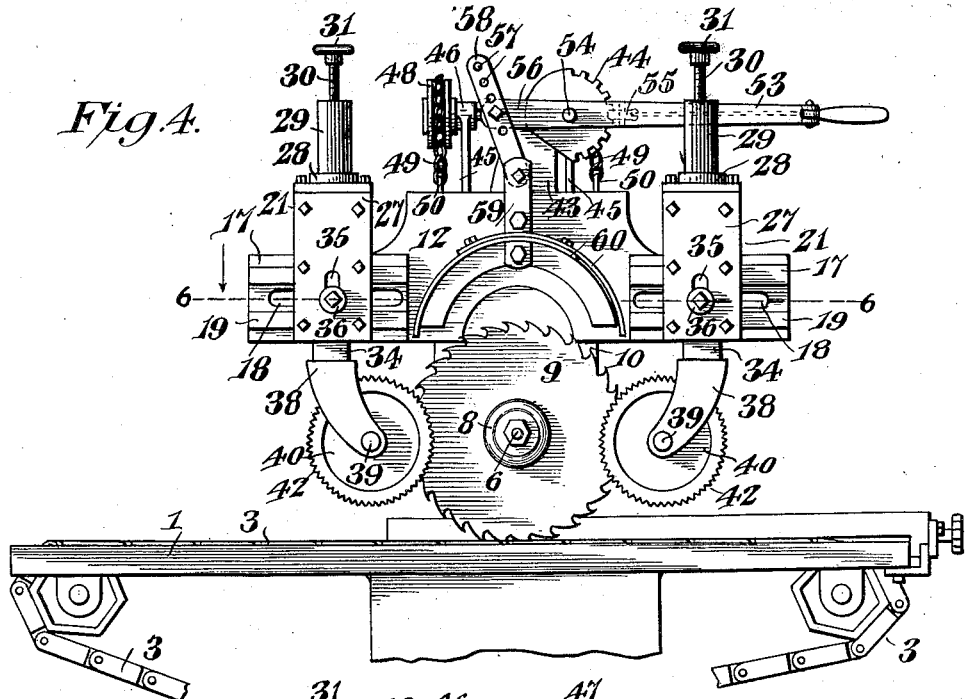
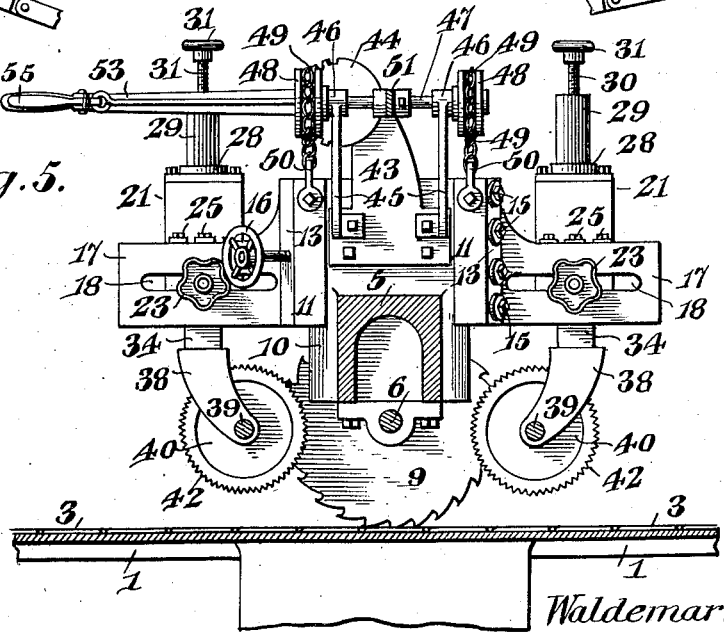
WITNESSES
Jas. K. McCathran
F. T. Chapman
Waldemar Giertsen
INVENTOR
BY
C. G. Siggers
ATTORNEY W. GIERTSEN.
CHAIN FEED SAW.
APPLICATION FILED JUNE 7, 1913.
1,109,747.
Patented Sept. 8, 1914.
3 SHEETS—SHEET 3.
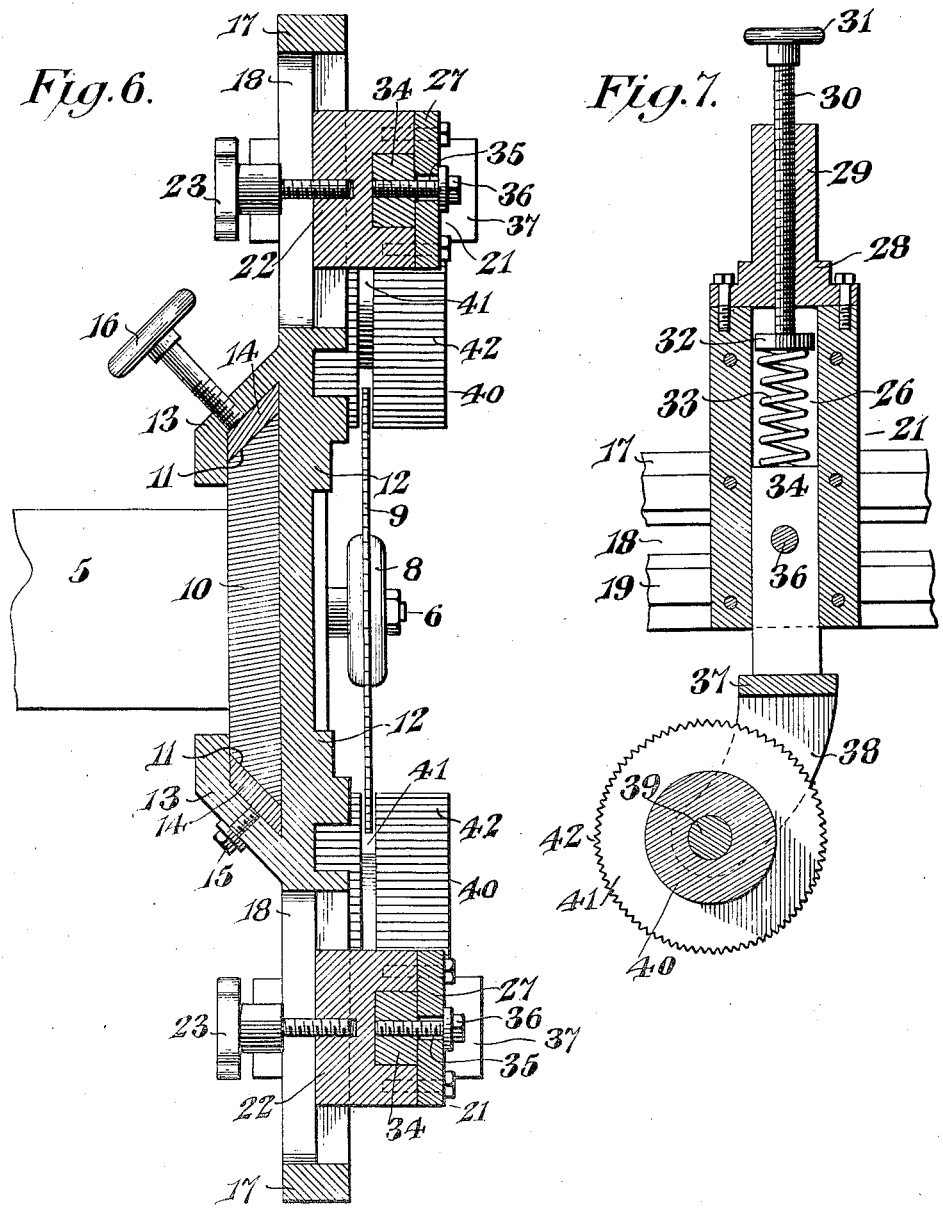
WITNESSES
Waldemar Giertsen
INVENTOR
BY
ATTORNEY

UNITED STATES PATENT OFFICE.

WALDEMAR GIERTSEN, OF CHICAGO, ILLINOIS.

CHAIN-FEED SAW.

1,109,747.  Specification of Letters Patent.  Patented Sept. 8, 1914.

Application filed June 7, 1913. Serial No. 772,345.

*To all whom it may concern:*

Be it known that I, WALDEMAR GIERTSEN, a citizen of the United States, residing at Chicago, in the county of Cook and State of Illinois, have invented a new and useful Chain-Feed Saw, of which the following is a specification.

This invention has reference to improvements in chain feed saws, and its object is to provide means associated with the saw for feeding the work thereto and holding the work in engagement with a feed chain in close relation to the active portion of the saw, the present invention having to do with a machine in which the cutter is in the form of a circular saw.

In the machine of the present invention the saw arbor may be supported in a manner permitting its adjustment up and down with relation to the feed chain, and the latter may be provided with a longitudinal groove into which the teeth of the saw will enter for a short distance, so that the saw may completely sever the work where such is desired.

By the term saw it is not to be understood that the invention is confined to the use of a single circular saw, for a gang of saws may be employed for certain character of work, the feed chain and other parts being correspondingly modified.

On each side of the saw in the direction of travel of the work are presser rollers designed to hold the work in close engagement with the feed chain, and these rollers are so mounted and constructed that they may engage the work in close relation to the active edge of the saw, the rollers being grooved to permit them to partially embrace the saw where it is desired to cut short pieces of stock, while for long pieces these feed rollers are readily adjustable to engage the work at greater distances from the saw.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a plan view of a portion of a machine embodying the present invention. Fig. 2 is a section on the line 2—2 of Fig. 1. Fig. 3 is a section on the line 3—3 of Fig. 1, some distant parts being omitted. Fig. 4 is a front elevation of the saw carrying head and a portion of the table underlying it. Fig. 5 is a section on the line 5—5 of Fig. 1. Fig. 6 is a section on the line 6—6 of Fig. 4 but drawn on a larger scale. Fig. 7 is a section through one of the presser roller carriers.

Referring to the drawings, there is shown a table 1 provided with a slot 2 through which travels a feed chain 3, this chain being made up of closely associated links having a roughened engaging surface and each link is shown as provided with a single longitudinal groove 4 matching those of the other links and in alinement therewith, so that the chain, which is an endless chain, has a single longitudinal groove throughout its length. This groove is to be taken as typical of either one or a series of grooves, since this feature is not broadly claimed in the present application, but in the Nelson application hereinafter referred to.

Rising above the table 1 is an arm 5 in overhanging relation to the table, and this arm is designed to support various structures which enter into the present invention. Journaled on the arm is an arbor 6 having a pulley 7 at one end and the usual clamping means 8 for a circular saw 9 at the other end, the saw being so located that it overhangs the chain 3 with its cutting edge entering the groove 4 when it is desired to completely sever the work. At the free end of the arm 5, which for convenience of description may be called the front end, there is an upstanding portion 10, which is provided with oppositely disposed beveled edges 11 in parallelism. Adapted to the upstanding end 10 of the arm 5 is a head 12 of considerably greater lateral extent than the end 10 of the arm 5, and this head has on its rear face oppositely disposed inclined flanges 13 shaped to receive the beveled edges 11 of the arm, so that the head may be adjusted up and down on the arm, while gibs 14 are introduced between the flanges 13 and beveled edges 11, one of these gibs being held by set screws 15, while the other may be engaged by a hand screw 16 threaded through the respective flange 13 so as to determine the degree of pressure with which the head 12 is held to the arm extremity 10 to take up all lost motion, as well as providing means for clamping the head tightly in place when desired.

The head 12 has lateral extensions 17 each provided with a longitudinal central slot 18 and dovetail guide tongues 19 on opposite sides of the slot 18, these tongues being embraced by dovetail flanges 20 on a respective carrier 21. Each carrier is formed with a rib 22 shaped to enter between the tongues 19 and a hand screw 23 is extended through the slot 18 and is threaded into the rib 22 so that the carrier may be adjusted to any desired point along the ribs 19 and then locked in the adjusted position. To avoid lost motion and take up all wear in the dovetail connection between each carrier 21 and its supporting extension 17, there is provided a gib 24 and set screws 25.

Each carrier 21, there being two such carriers, has a longitudinal central channel 26 formed therein, and this channel is closed by a face plate 27, while at what constitutes the upper end of the carrier there is secured a head 28 continued into a neck 29 through which is threaded a screw rod 30 having a hand wheel 31 at the upper end and at the lower end engaging a follower 32 bearing against one end of a spring 33 housed in the channel 26, while the other end of the spring bears against a stem 34 appropriately shaped to snugly fit the channel and yet slide therein with freedom. It is customary to make the channel rectangular and the stem 34 is of corresponding shape. The face plate 27 is formed with a longitudinal slot 35 through which there is passed a set screw 36 entering the stem 34 to hold the latter in different positions of projection with respect to the lower end of the carrier.

The lower end of the stem 34 is formed with a laterally extended head 37 from opposite ends of which depend spaced arms 38 curving away from the longitudinal center line of the stem 34 after the manner of a caster wheel support, and the free ends of these arms carry an arbor 39 upon which is mounted a presser wheel or roller 40, this presser wheel having a central peripheral groove 41 entering it for an appropriate distance, while the outer edge of the wheel may be roughened, as indicated at 42, either in the form of parallel ridges or otherwise, although the roughening is not obligatory.

The upwardly extended end 10 of the arm 5 carries a bracket 43 which may be located between the flanges 13 on what may be termed the rear face of the extension 10, and this bracket terminates in a rack segment 44. Fast to the bracket 43 are other spaced brackets 45 each at the upper end terminating in a bearing 46 for a shaft 47 which at the ends outside of the bearings 46 carries grooved pulleys 48 to each of which there is secured one end of a chain 49 wound partly about the pulley and at the other end connected to a respective flange 13 as by a hook 50, or in any other suitable manner. The shaft 43 has secured thereto one end of an arm 51, the other end of which overhangs the arm 5 and is provided with an adjustable weight 52, the tendency of the weighted arm being to rotate the shaft 47 in a direction to wind the chains 49 about the pulleys 48 and thereby raise the head 12. To lower this head against the action of the weighted arm there is provided a lever 53 pivoted at 54 to the center of the rack 44, and this lever carries a thumb latch 55 in position to engage the teeth of the rack 44. The lever has a short arm 56 connected through any one of a series of holes 57 to a link 58 containing said holes, while one end of the link is pivoted to a strap 59 made fast to the head 12. By this means the head 12 may be lowered against the action of the weighted arm 51 to any desired extent which may be increased or diminished in accordance with the connection of the lever 53 to the link 58 and the raising movement of the head may be brought about by the weighted arm 51, or if the latter simply counterbalances the head, then the lever 53 may be utilized for raising, as well as lowering the head. The head 12 is provided with a divided guard plate 60 overhanging the saw 9.

Considering the parts as all properly adjusted, the saw has its teeth entering the groove 4 when it is desired to completely sever the work and the presser rollers 40 are adjusted as close to the center of the saw as the depth of the grooves 41 will permit, so that the active portions of the rollers engage the work in close relation to the cutting edge of the saw and may, therefore, engage and hold work which is but little longer than the width of the saw. These rollers have their arbors 39 each connected to a drive shaft 61 through an intermediate connecting shaft 62 joined at the ends of the arbor 39 and shaft 61 by respective universal couplings 63 to allow for the adjustment of the carriers 24 along the extensions 17. The shafts 61 are connected together for rotation in the same direction by sprocket wheels 64 on each shaft and a sprocket chain 65, while the shafts may be driven through suitable gearing engaging a pinion 66 on one of the shafts 61. These rollers may be driven with a peripheral speed agreeable to the rate of travel of the chain 3, so that the work is engaged on opposite faces and propelled without slippage. The head 12 may be raised or lowered by manipulating the lever 3 to accommodate the presser rollers to work of different thicknesses, while the springs 33 may regulate the grip of the rollers upon the work, the tension of the springs being determined by the screws 30, and while the set screws 36 need only serve as means for preventing the rollers 40 from dropping too far, they may also lock the rollers in position when yielding pressure is not necessary.

While in the drawings the presser rollers are shown in closer relation to the saw arbor than the supports or stems 34, the presser rollers may be placed in more distant relation to the saw than the supports 34 by reversing the latter in the carriers 24. The various adjustments provided admit of the use of circular saws 9 of different diameters which is of advantage under some conditions.

The invention herein described is intended as an improvement on the invention shown, described and claimed in the application of Arthur W. Nelson, Serial No. 663,094, filed November 29, 1911.

What is claimed is:—

1. In a machine of the class described, the combination with a circular saw, and a chain traveling beneath the saw and presenting a flat working face for supporting material fed to the saw, and a presser roller located above the chain and peripherally grooved for the entrance of the cutting edge of the saw and projecting inwardly under the same so as to engage the material close to the active portion of the saw.

2. In a machine of the class described, the combination with a circular saw, of a feeding chain traveling beneath the saw and presenting a flat upper face to the work, said saw extending into the feeding chain below the working face thereof, and a presser roller located above the chain and peripherally grooved for the entrance of the cutting edge of the saw, whereby the roller is adapted to project inwardly under the circular saw and engage the work close to the active portion of the same.

3. In a machine of the class described, the combination with a circular saw, and a feeding chain traveling beneath the saw and presenting a flat working face to the material fed to the saw, a presser roller peripherally grooved for the entrance of the teeth of the saw thereinto and provided with a supporting member in which the presser roller is journaled, said supporting member having a stem and arms in embracing relation to the roller and extended away from the center line of the stem to arrange the roller in a projecting position beneath the saw in close proximity to the active portion thereof.

4. In a machine of the class described, the combination with a circular saw, and a chain traveling beneath the same, of a head and support therefor upon which the head is adjustable up and down, said saw being mounted on the support, carriers on the head adjustable laterally thereof, and presser rollers mounted on the said carriers and located in advance and in rear of the saw, the presser rollers being each peripherally grooved to receive the cutting edge of the saw, whereby the rollers are adapted to project inwardly under the saw for engaging the material close to the active portion of the said saw.

5. In a machine of the class described, the combination with a circular saw, and a feeding chain traveling beneath the saw, of an arm supporting the saw, a head mounted on the arm to move up and down with respect thereto, a shaft journaled on the arm and provided at opposite sides thereof with pulleys and having a counterweight, flexible connections between the pulleys and the said head, a lever carried by the arm, connections between the lever and the head for raising and lowering the head, and presser rollers carried by the head and located in advance and in rear of the saw.

6. In a machine of the class described, the combination with a circular saw, and a feeding chain traveling beneath the same, of pressure rollers each peripherally grooved to receive the cutting edge of the saw and provided with a supporting member with the axis of the roller displaced laterally with respect to the center line of the supporting member, the latter being reversible to arrange the presser roller close to the saw or in more distant relation thereto.

7. In a machine of the class described, the combination with a circular saw, and a feeding chain traveling beneath the saw, of presser rollers each peripherally grooved to receive the cutting edge of the saw and each provided with a supporting member with the axis of the roller displaced laterally with respect to the center line of the supporting member, and a carrier for the supporting member adjustable to move the rollers toward and from the saw on opposite sides, said supporting members for the presser rollers being reversible in the carrier to arrange the presser rollers close to the saw or in more distant relation thereto.

8. In a machine of the class described, the combination with a circular saw, of a feeding chain composed of an endless series of links, each provided with a centrally arranged groove extending the entire length of the links and registering with the grooves of the adjacent links to form in the active run of the saw a continuous groove into which the teeth of the saw extend, and a presser roller located above and coacting with the chain and provided with a centrally arranged peripheral groove receiving the cutting edge of the saw to permit the roller to project inwardly beneath the said saw for engaging the material close to the active portion of the said saw.

9. In a machine of the class described, the combination with a circular saw, of a feeding chain composed of an endless series of metallic links, each hinged at its ends to the next adjacent links and having a flat working face and provided therein with a groove extending the entire length of the link and registering with the grooves of the adjacent links to form a continuous groove in the active run of the chain to receive the saw, said links having their working faces roughened at each side of the groove, and a presser roller located above the feeding chain and peripherally grooved to receive the cutting edge of the saw and roughened at opposite sides of the groove to coact with the chain in gripping the material.

10. In a machine of the class described, the combination with a circular saw, and a feeding chain traveling beneath the saw, of a presser roller peripherally grooved at its center, the grooves being of a depth to wholly receive the teeth of the saw and having a width to permit the saw to work in the groove without contacting with the walls thereof, the peripheral face of the roller being roughened at each side of the groove.

11. In a machine of the class described, the combination with a circular saw, and a chain traveling beneath the same, of a supporting head, arbors carried by the head and located in advance and in rear of the saw, presser rollers mounted on the said arbors, power mechanism, connecting means including universal joints for connecting the power mechanism with the arbors, and means for adjusting the presser rollers toward and from the saw.

12. In a machine of the class described, the combination with a circular saw, and a feeding chain traveling beneath the saw, of an adjustable supporting head, carriers slidable inwardly and outwardly on the supporting head with respect to the cutting edge of the saw, arbors mounted on the carriers, presser rollers fixed to the arbors, power mechanism, and connecting means including universal joints for connecting the power mechanism with the arbors, and means for raising and lowering the supporting head.

13. In a machine of the class described, the combination with a circular saw, and a feeding chain traveling beneath the saw, of carriers located in advance and in rear of the saw, arbors journaled on the carriers, presser rollers mounted on the arbors, power mechanism, and connecting means including universal joints for connecting the power mechanism with the arbors, said connecting means permitting independent adjustment of the carriers with their presser rollers.

14. In a machine of the class described, the combination with a circular saw, and a feeding chain traveling beneath the saw, two peripherally grooved presser rollers located in advance and in rear of the saw and adapted to have the teeth thereof project into their grooves, shafts, connecting means including universal joints for connecting the shafts with the presser rollers to permit independent adjustment of the latter, and power driven mechanism for rotating the shafts in unison.

In testimony, that I claim the foregoing as my own, I have hereto affixed my signature in the presence of two witnesses.

WALDEMAR GIERTSEN.

Witnesses:
RALPH B. GROVE,
LILLIAN MANSFIELD.